United States Patent Office 3,087,930
Patented Apr. 30, 1963

3,087,930
HYDROINDOLO[2,3-α]QUINOLIZINES
Robert N. Schut, Edwardsburg, Mich., assignor to Miles
Laboratories, Inc., Elkhart, Ind., a corporation of
Indiana
No Drawing. Filed Aug. 9, 1961, Ser. No. 131,961
7 Claims. (Cl. 260—288)

This invention relates to hydroindolo[2,3-a]quinolizines. In one of its more particular aspects, this invention relates to 1,2,3,4,6,7,12,12b-octahydro-2-oxoindolo-[2,3-a]quinolizines, to the corresponding dodecahydro benz[f]indolo[2,3-a]quinolizine, certain derivatives thereof and their methods of synthesis.

Hydroindolo[2,3-a]quinolizines are of interest as useful chemical intermediates for the synthesis of yohimbine type alkaloids. The structural configuration of the quinolizines in question forms an intrinsic part of the yohimbine molecule as well as that of certain related alkaloids.

The present invention is concerned with the provision of indolo quinolizines which correspond to the formula—

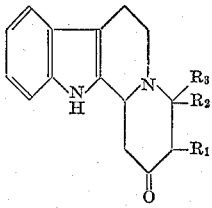

in which $R_1$ and $R_2$ may represent hydrogen or lower alkyl groups and $R_3$ may represent an alkyl or aryl group.

In addition, the invention is concerned with the provision of derivatives of these indolo quinolizines, particularly the ketals and various salts of these compounds.

The indolo quinolizine corresponding to the formula—

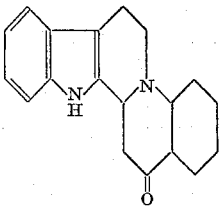

is also included within this invention and, as pointed out below, may be similarly prepared. The invention is also concerned with salts of these compounds. It may be seen from a comparison of the two formulae given above that the second compound is related to the first series of compounds in that $R_1$ and $R_3$ of the first series together represent the tetramethylene group in the second.

These compounds may be conveniently prepared by means of a synthetic scheme which involves a series of steps beginning with the condensation of tryptamine with the hydroxymethylene derivative of an α,β-unsaturated ketone (II). The condensation may be conveniently conducted in aqueous solution at room temperature. The condensation product (III) is then reacted with methanolic hydrogen chloride and the resulting intermediate (IV) is converted to the desired compounds by means of heating with sodium bicarbonate or other base in an aqueous methanolic or other alcoholic medium. The reaction sequence may be seen in the following series of equations—

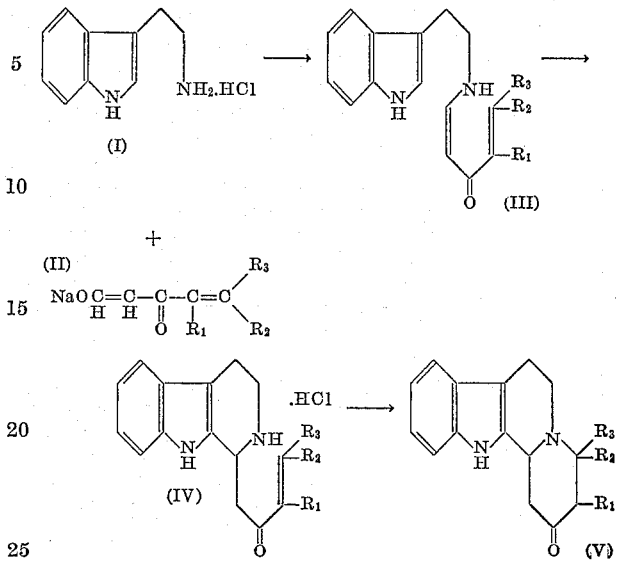

The free bases (V) produced in accordance with the synthesis outlined above may be readily converted to various salts, or ketals of the compounds may be formed by treatment of the free base with alcoholic hydrogen chloride. For example, where methanol is used the dimethyl ketal hydrochloride results. If isopropyl alcohol is used instead of the methyl alcohol, however, the ketal is not formed and the hydrochloride results instead.

Each of the reactions described above may be carried out under mild conditions. The product can in most cases be obtained in an overall yield of about 50% to 70%.

In order to prepare the corresponding dodecahydro derivatives, the use of an appropriate starting material in which the unsaturated ketone is a cyclohexene derivative is necessary.

The invention will be better understood by reference to the following examples which are included for purposes of illustration and are not to be construed as in any way limiting the scope of the instant invention which is defined in accordance with the claims appended hereto.

EXAMPLE I

*1,2,3,4,6,7,12,12b - Octahydro-2-Oxo-4,4-Dimethylindolo-[2,3-a]Quinolizine, Hydrochloride and Dimethyl Ketal Hydrochloride*

A. *Sodio hydroxymethylene derivative of mesityl oxide.*—To a stirred suspension of 27 g. (0.50 mole) of freshly prepared sodium methoxide in 200 ml. of anhydrous ether was added a mixture of 49 g. (0.50 mole) of mesityl oxide and 37 g. (0.50 mole) of ethyl formate in 100 ml. of ether over a 1-hour period (N$_2$ atmosphere, 0–5°). The mixture was stirred an additional hour, then filtered. The crude product was washed with ether and dried in the vacuum dessicator at room temperature; yield 27 g. (36%).

B. *N-tryptaminomethylene mesityl oxide.*—A solution of 7.78 g. (0.039 mole) of tryptamine hydrochloride in 100 ml. of water was added to a stirred solution of 8.0 g. (0.054 mole) of the sodio hydroxymethylene derivative of mesityl oxide in 100 ml. of water. The precipitated yellow semisolid was extracted with chloroform and the extract was dried and concentrated in vacuo to give 9.2 g. (88%) of brown sirup;

$\nu_{max.}^{CHCl}$ 1620 cm.$^{-1}$; $\lambda_{max.}^{MeOh}$ 335 m$\mu$, $\epsilon$ 15,500 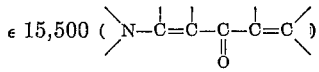

The nitrogen analysis indicated 94.5% purity.

*Analysis.*—Calcd. for $C_{17}H_{20}N_2O$: N, 10.44. Found: N, 9.88.

C. *1-(2-oxo-4-methyl-3-pentenyl)-1,2,3,4 - tetrahydro-β-carboline hydrochloride.*—A solution of 8.5 g. (0.032 mole) of N-tryptaminomethylene mesityl oxide in 50 ml. of methanol was saturated with hydrogen chloride. Ether (50 ml.) was added and the solution was allowed to cool for 2 hours. The ivory-colored crystalline salt was filtered and washed with methanol-ether to give 3.1 g. of product, M.P. 205–210° (dec.). Second and third crops isolated from the filtrate increased the yield to 5.7 g. (59%). The infrared spectrum (KBr) showed bands at 1680 (C=O, conj.) and 1620 cm.$^{-1}$ (C=C, conj.).

*Analysis.*—Calcd. for $C_{17}H_{21}ClN_2O$: Cl, 11.64. Found Cl, 11.73.

D. *1,2,3,4,6,7,12,12b - octahydro-2-oxo-4,4-dimethylindolo[2,3]quinolizine and hydrochloride.*—A mixture of 4.98 g. (0.0163 mole) of the tetrahydro-β-carboline hydrochloride described above, 100 ml. of ethanol and 50 ml. of 10% sodium bicarbonate solution was heated under reflux for 2 hours. The mixture was cooled and the crystalline product filtered and washed with a little cold aqueous alcohol. The yield was 4.20 g. (96%), M.P. 225–227°;

$\nu_{max.}^{KBr}$ 1710 cm.$^{-1}$ (normal ketone C=O)

The analytical sample was produced by recrystallization from 95% methanol, M.P. 227–227°.

*Analysis.*—Calcd. for $C_{17}H_{20}N_2O$: N (basic), 5.22. Found: N, 5.18 (titration).

A 10-g. sample of the free base in 100 ml. of warm isopropyl alcohol was treated with a solution of 4 g. of hydrogen chloride in 50 ml. of isopropyl alcohol. The hydrochloride salt precipitated immediately. Recrystallization was accomplished by addition of just enough water to dissolve the salt. The solution was cooled and the precipitated crystalline hydrochloride was filtered, washed with cold isopropyl alcohol and dried to give 6.5 g. of product, M.P. 230–235° (dec.).

*Analysis.*—Calcd. for $C_{17}H_{21}ClN_2O$: Cl, 11.64. Found: Cl, 11.49.

E. *1,2,3,4,6,7,12,12b - octahydro-2,2-dimethoxy-4,4-dimethylindolo[2,3-a]quinolizine hydrochloride.*—A solution of 1.53 g. (5.70 mole) of the free base described above was suspended in 50 ml. of cold methanol. Hydrogen chloride was slowly bubbled into the methanol at 15 to 20°. The free base dissolved as the hydrochloride formed. An equal volume of ether was added and the solution was allowed to cool. The white precipitate which formed was filtered, washed with ether-methanol and dried to give 1.44 g. (72%) of the ketal hydrochloride, M.P. 197–199° (dec.);

$\nu_{max.}^{KBr}$ C=O, absorption absent

*Analysis.*—Calcd. for $C_{19}H_{27}ClN_2O_2$: Cl, 10.11. Found: Cl. 10.01.

EXAMPLE II

*1,2,3,4,6,7,12,12b - Octahydro - 2 - Oxo - 4 - Phenylindolo[2,3-a]Quinolizine, Hydrochloride and Dimethyl Ketal Hydrochloride*

A. *N-tryptaminomethylene benzalacetone.*—This compound was prepared according to the procedure given in Example 1–B. The intermediate was obtained as a dark yellow powder in quantitative yield. For analysis a sample was recrystallized from benzene-Skelly B as a yellow powder, M.P. 124–126°;

$\nu_{max.}^{CHCl_3}$ 1640 (m.) and 1610 (s.) cm.$^{-1}$; $\lambda_{max.}^{MeOH}$ 368 m$\mu$, $\epsilon$ 18,800

*Analysis.*—Calcd. for $C_{21}H_{20}N_2O$: N, 8.86. Found: N, 8.65.

B. *1-(2-oxo-4-phenyl-3-butenyl)-1,2,3,4-tetrahydro-β-carboline hydrochloride.*—This compound was prepared in 57% yield according to the procedure described in Example 1–C. Recrystallization from aqueous methanol produced the analytical sample, M.P. 218–219° (dec.);

$\nu_{max.}^{KBr}$ 1650, 1620 and 1600 cm.$^{-1}$ 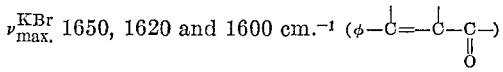

*Analysis.*—Calcd. for $C_{21}H_{21}ClN_2O$: Cl, 10.06. Found: Cl, 9.93.

C. *1,2,3,4,6,7,12,12b-octahydro - 2-oxo-4-phenylindolo[2,3-a]quinolizine and hydrochloride.*—To a suspension of 18.3 g. (0.052 mole) of the tetrahydro-β-carboline hydrochloride in 500 ml. of hot ethanol was added 60 ml. of 10% sodium bicarbonate solution. The mixture was heated under reflux for 12 hours. Water (100 ml.) was added and the mixture was cooled. The yellow-colored crystalline material was filtered, washed with aqueous ethanol and dried to give 14.7 g. (90%) of product. M.P. 232–233°. The analytical sample was prepared by recrystallization from aqueous ethanol M.P. 233–234°;

$\nu_{max.}^{KBr}$ 1720 cm.$^{-1}$ (Normal ketone C=O)

*Analysis.*—Calcd. for $C_{21}H_{20}N_2O$: N (basic), 4.43. Found: N, 4.35 (titration).

A sample of the free base suspended in hot isopropyl alcohol was treated with hydrogen chloride. The mixture was warmed a few minutes on the steam bath and filtered. The hydrochloride had M.P. 202–203° (dec.);

$\nu_{max.}^{KBr}$ 1720 cm.$^{-1}$

*Analysis.*—Calcd. for $C_{21}H_{21}ClN_2O$: Cl, 10.06. Found: Cl, 9.92.

D. *1,2,3,4,6,7,12,12b - octahydro - 2,2-dimethoxy - 4-phenylindolo[2,3-a]quinolizine hydrochloride.*—The dimethyl ketal hydrochloride was obtained in 57% yield from methanol-ether, M.P. 173–174° (dec.);

$\nu_{max.}^{KBr}$ only weak band present in C=O region

*Analysis.*—Calcd. for $C_{23}H_{27}ClN_2O_2$: Cl, 8.90. Found: Cl, 8.81.

EXAMPLE III

*1,2,3,4,4a,6,7,12,12b,13,14,14a - Dodecahydro - 14 - Oxobenz[f]Indolo[2,3-a]Quinolizine and Hydrochloride*

A. *1 - (N - tryptaminomethylene)acetylcyclohexene.*—This compound was obtained as a thick yellow sirup (quantitative yield) according to Example 1–B using tryptamine hydrochloride and the sodiohydroxymethylene derivative of 1-acetylcyclohexene. A sample of this crude product was recrystallized from benzene-Skelly B in the form of a yellow powder, M.P. 102–103.5°;

$\nu_{max.}^{CHCl_3}$ 1620, 1540 and 1480 cm.$^{-1}$; $\lambda_{max.}^{MeOH}$ 340 m$\mu$, $\epsilon$ 21,700

*Analysis.*—Calcd. for $C_{19}H_{22}N_2$: N, 9.52. Found: N, 9.42.

B. *1 - (1-acetylcyclohexenyl)1,2,3,4 - tetrahydro-β-carboline hydrochloride.*—The ivory-colored hydrochloride, M.P. 215–220° (dec.), was obtained in 79% yield according to procedure 1–C. The infrared spectrum (KBr) showed a band at 1655 cm.$^{-1}$ and shoulder at 1630 cm.$^{-1}$ (conj., ketone C=O).

*Analysis.*—Calcd. for $C_{19}H_{23}ClN_2O$: Cl, 10.73. Found: Cl, 10.71.

C. *1, 2, 3, 4, 4a, 6, 7, 12, 12b, 13, 14, 14a-dodecahydro-14-oxobenz[f]indolo[2,3 - a]quinolizine and hydrochloride.*—This indoloquinolizine was obtained in 88% yield according to the method described in Example 1–D. The compound has M.P. 216–217° and showed a normal ketone carbonyl band at 1710 cm.$^{-1}$ in the infrared. An analytical sample was prepared by recrystallization from methanol, M.P. 219–220°.

*Analysis.*—Calcd. for $C_{19}H_{22}N_2O$: N (basic), 4.76. Found: N, 4.74 (titration).

The hydrochloride was obtained from methanol in the form of small white crystals, M.P. sintering 200°.

*Analysis.*—Calcd. for $C_{19}H_{23}ClN_2O$: Cl, 10.73. Found: Cl, 10.70.

As pointed out above, the compounds thus produced may serve as useful intermediates in the synthesis of yohimbine type alkaloids. For example, the reaction of V with 4-diethylaminobutan-2-one methoidide under the conditions of the Robinson reaction (E. C. du Feu, F. J. McQuillin and R. Robinson, J. Chem. Soc. 53 (1937) and G. B. Kline, J. Am. Chem. Soc. 81, 2251 (1959) should result in the formation of the pentacyclic structure VI which is a Δ-15,16-yohimben-17-one—

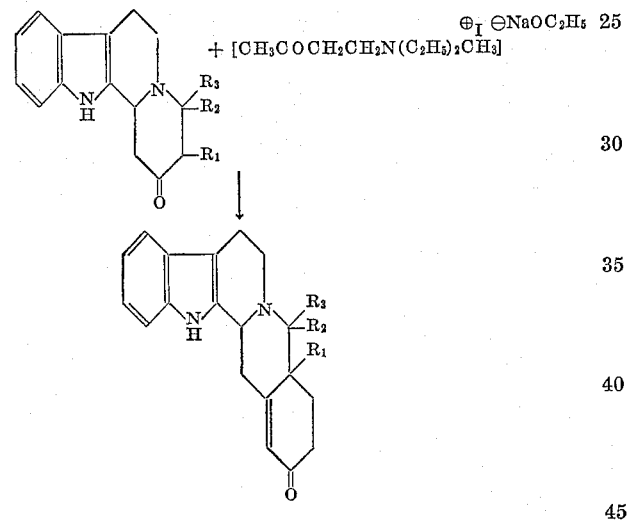

In summary this invention provides certain octahydro oxoindolo quinolizines and dodecahydro oxobenz-indolo quinolizines corresponding to the formulas given above. These compounds are useful as intermediates in the synthesis of yohimbine type alkaloids.

What is claimed is:

1. 1, 2, 3, 4, 6, 7, 12, 12b-octahydro-2-oxo-4,4-dimethylindolo[2,3-a]quinolizine dimethyl ketal.

2. 1, 2, 3, 4, 6, 7, 12, 12b-octahydro-2-oxo-4-phenylindolo[2,3-a]quinolizine.

3. 1, 2, 3, 4, 6, 7, 12, 12b-octahydro-2-oxo-4-phenylindolo[2,3-a]quinolizine dimethyl ketal.

4. 1, 2, 3, 4, 4a, 6, 7, 12, 12b, 13, 14, 14a-dodecahydro-14-oxobenz[f]indolo[2,3-a]quinolizine.

5. A process for the preparation of a compound having the formula—

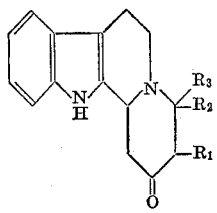

wherein $R_1$ and $R_2$ each is selected from the group consisting of hydrogen and lower alkyl and $R_3$ is a member selected from the group consisting of alkyl and aryl which comprises reacting tryptamine hydrochloride with a compound having the formula—

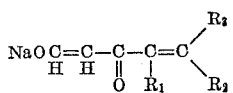

in aqueous solution, reacting the product of this reaction, having the formula—

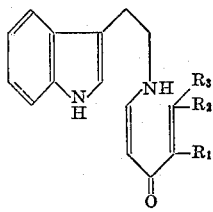

with methanolic hydrogen chloride to produce a compound having the formula—

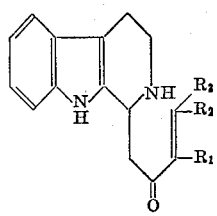

and reacting this compound with sodium bicarbonate and aqueous ethanol to form the product having the formula—

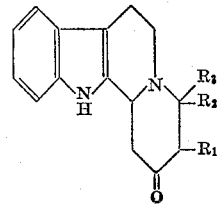

6. A process according to claim 7 wherein the product having the formula—

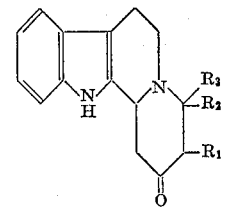

is reacted with methanolic hydrogen chloride to give a corresponding dimethyl ketal having the formula—

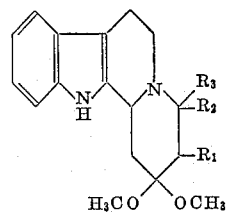

7. A process for the preparation of a compound having the formula—

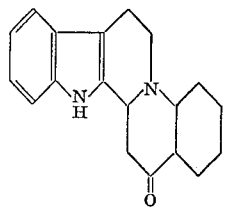

which comprises reacting tryptamine hydrochloride with the sodiohydroxymethylene derivative of 1-acetylcyclohexene in aqueous solution to produce 1-(N-tryptaminomethylene) acetylcyclohexene having the formula—

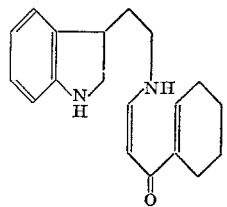

reacting this product with methanolic hydrogen chloride to produce 1-(1-acetylcyclohexenyl)-1,2,3,4-tetrahydro-β-carboline having the formula—

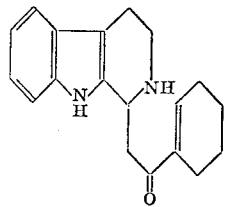

and reacting said product with sodium bicarbonate and aqueous ethanol to produce the desired product having the formula—

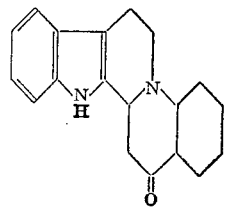

References Cited in the file of this patent
UNITED STATES PATENTS
2,908,686    Cohen et al. _____ Oct. 13, 1959